April 18, 1933.　　　　E. BLUM　　　　1,903,890
OPTICAL POLYGRAPH
Filed March 7, 1931　　　2 Sheets-Sheet 1
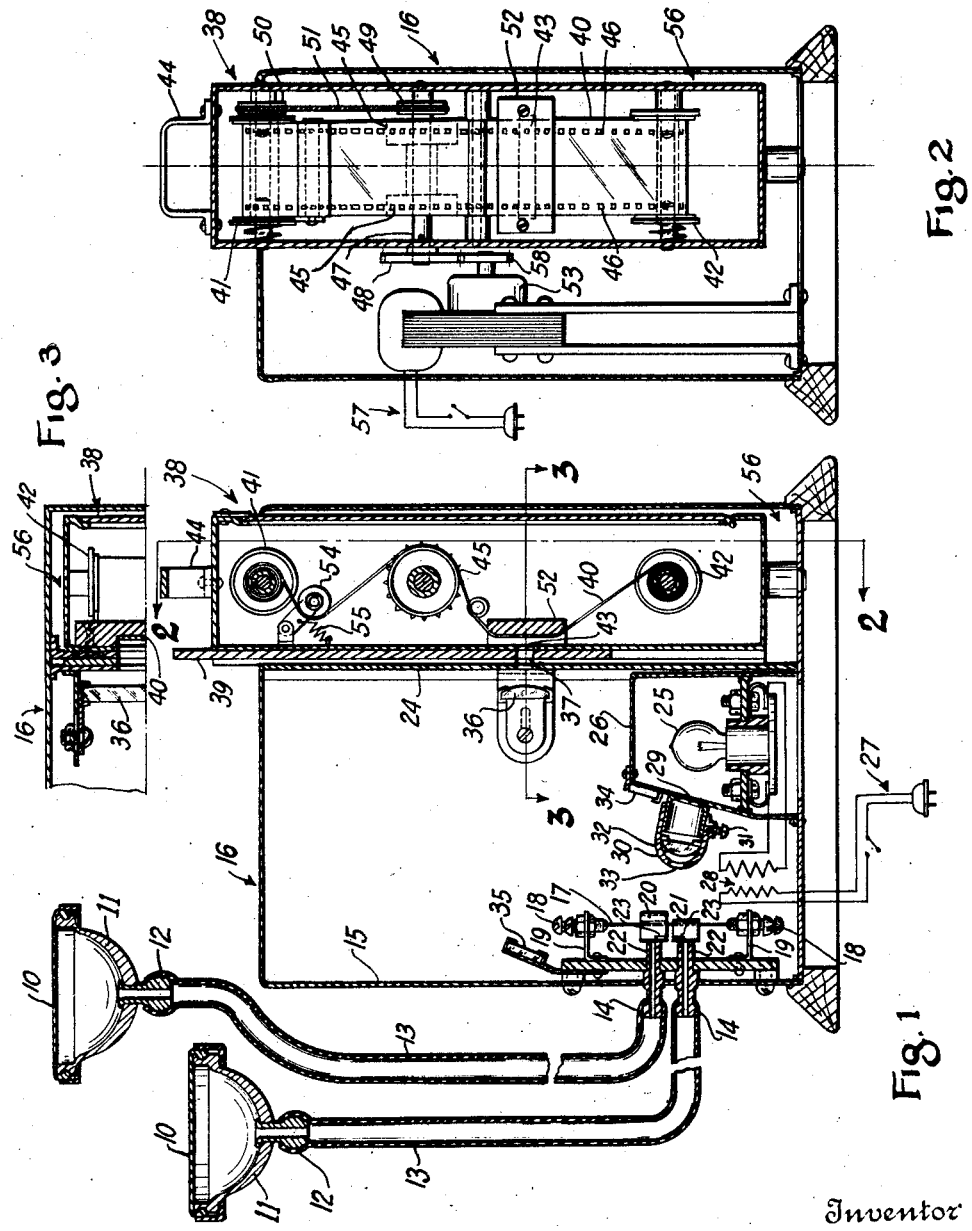
Inventor
EMIL BLUM
By his Attorney
Joseph Blacker Patented Apr. 18, 1933

1,903,890

UNITED STATES PATENT OFFICE

EMIL BLUM, OF NEWARK, NEW JERSEY

OPTICAL POLYGRAPH

Application filed March 7, 1931. Serial No. 520,787.

The present invention relates to improvements in super-sensitive apparatus for producing photographic records of arterial pulsations taken simultaneously at different parts of the body.

An object of this invention resides in the provision of means whereby arterial pulsations acting upon diaphragms cause air pulsations to exert impulses against sensitively mounted vibratory mirrors having a beam of light projected jointly thereon, the said impulses exerting their full force in setting the mirrors in vibration and causing changes in the direction of the reflected beams of light from said vibratory mirrors to effect wavy tracings upon a moving photographic film.

Another object of this invention resides in the provision of a portable optical polygraph by means of which it is very easy for physicians to study the natural tremors of the human body and to detect certain ailments which produce characteristic tremors.

Another object of this invention resides in the particular arrangement and structural features of the cooperating elements.

With the above and other objects in view, the invention will be hereinafter more particularly described and the combination and arrangement of parts will be shown in the accompanying drawings and pointed out in the claims which form part of this specification, it being understood that the embodiment herewith shown is merely illustrative and that various changes in the form, proportion, size and minor details of construction within the scope of the claims, may be resorted to without departing from the spirit of the invention.

Reference will now be had to the drawings, wherein like numerals of reference designate corresponding parts throughout the several views, in which:

Figure 1 is a vertical section of the cooperating elements of my optical polygraph.

Figure 2 is a vertical section taken as on line 2—2 in Figure 1.

Figure 3 is a fragmentary section taken as on line 3—3 in Figure 1.

Figure 4:
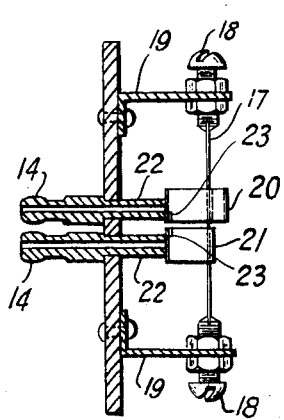
Figure 4 is an enlarged sectional view of two vibrating arms and mirrors shown in Figure 1.
Figure 5:
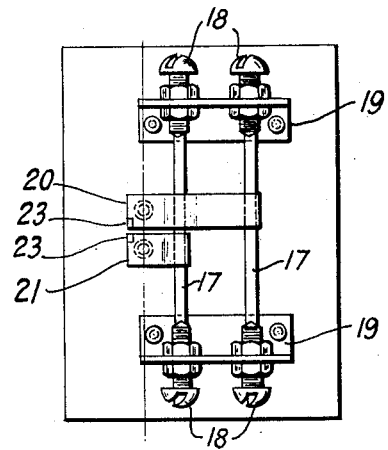
Figure 5 is an enlarged front elevation of the two vibrating arms and mirrors.

In the illustrated embodiment of the invention, Figure 1, shows two diaphragms 10, 10, suitably supported in air tight bell housings 11, 11, having depending nipples 12, 12. Rubber tubes 13, 13, are attached at one end to the nipples 12, 12, and at the other end to tubular members 14, 14, which are fixedly mounted in a side wall 15, of a lightproof enclosure 16. Two thin ribbon-like hair springs 17, 17, best shown on an enlarged scale in Figure 5, are mounted in a vertical position for vibration on screws 18, 18 and brackets 19, 19, inside the enclosure 16, adjacent the tubular members 14, 14. The tension in the springs 17, 17, may be varied for sensitiveness to tortional vibration by adjusting the screws 18, 18. Two arms 20, 21, are attached to the respective springs 17, 17, and are suitably shaped so as to closely contact with the inner ends 22, 22, of the tubular members 14, 14, and due to the urging of the springs, they press against and seal said tubular members. Two small mirrors 23, 23, of minute dimensions are fastened to the arms 20, 21, in a vertical plane in close relation and face the side wall 24, of the enclosure 16. As best shown in Fig. 5, the mirrors 23, 23, are positioned at the free ends of the arms 20, 21, and are adapted to swing freely in horizontal planes to and from the inner ends of the tubular members about the vertical axes formed by the hairsprings 17, 17, and when an impulse is exerted against an arm, in a direction outwardly from a tubular member, the said seal is broken, and the air in the tubular member and in the attached rubber tube is unconfined and can escape freely therefrom and its outward motion is not impeded by any frictional resistances. The slightest pulsations exerted against the diaphragms 10, 10, sets the air in the rubber tubes 13, 13, in vibration and these vibrations are transmitted to the arms 20, 21, and to the mirrors 23, 23, and causes the mirrors to vibrate. The structure thus described forms two independent optical pulsating elements or pulsatile optical levers of the present invention.

A source of light 25, preferably an electric bulb is housed within an enclosure 26, and is connected by means of an electric circuit 27, and a transformer 28, to a source of electric power. The enclosure 26 is provided with an aperture 29, facing the mirrors 23, 23.

A spherical condensing lens 30 is slidably mounted adjacent to the aperture 29, and may be adjusted relative to the mirrors 23, 23, by means of a screw 31. The lens 30 is housed within an enclosure 32, having an aperture 33, through which a concentrated beam of light from the spherical lens 30 may be made to impinge simultaneously and jointly upon both mirrors 23, 23. When the apparatus so far described is in a quiescent state, there will appear on each mirror a point of intense light.

A mirror 34 is fixedly mounted on the enclosure 26 in angular relation with and facing the plane of the vibratory mirrors 23, 23, and is adapted to receive the reflections of the points of light appearing on said mirrors. Another mirror 35 is fixedly mounted adjacent the side wall 15 in angular relation with and facing the mirror 34, and is adapted to receive the reflections of the points of light appearing on the mirror 34. A cylindrical condensing lens 36 is mounted with its longitudinal axis in a horizontal plane on the side wall 24 of the enclosure 16 in angular relation with the mirror 35, and is adapted to receive and concentrate and maintain the spaced relation of the points of light reflected from the mirror 35. An aperture 37 has been provided in the side wall 24, in alignment with the longitudinal axis of the cylindrical lens 36. A recording camera 38, having a shutter 39, is positioned adjacent to the side wall 24 and is provided with a sensitized photographic film 40, mounted on upper and lower spools 41, 42. The points of light reflected from the mirror 35 passes through the cylindrical lens 36, through the aperture 37 and through the aperture 43 of the camera, and impinges upon the film 40, in the form of two concentrated points of light.

Intermediate the upper and lower spools 41, 42, there has been provided sprockets 45, 45, which engage with sprocket holes 46, 46, in the film 40. The sprockets 45, 45, are mounted on a shaft 47, having a gear 48, at its free end. A pulley 49 is mounted on the shaft 47 in alignment with a pulley 50, in engagement with the spool 41, and a belt 51, engages both pulleys. A film guide 52 is provided adjacent the aperture 43, in the camera 38, the aperture 43 being in alignment with the aperture 37 in the side wall 24 of the enclosure 16. The film guide 52 serves to maintain the film 40 in right-angular relation with the horizontal axis through the apertures 43 and 37 and the lens 36. A pivoted roller 54 engages with the film 40 and serves to impart the necessary working tension to the film 40 by means of a spring 55. The camera 38 is a portable and independant unit and is housed in a compartment 56 adjacent the enclosure 16, and may be removed therefrom by means of a handle 44.

Operation of invention

The diaphragms 10, 10 are applied at different parts of the body of the patient and may be attached to the body by means of leather straps (not shown). The respective pulsations of the body are transmitted to the diaphragms and to the air in the tubes 13, 13, thus setting the arms 20, 21, and hairsprings 17, 17, and the mirrors 23, 23, of the two pulsatile elements in vibration in an angular direction in a vertical plane. The electric bulb circuit 27 and the motor circuit 57 are connected to electric power mains (not shown) and causes the electric bulb 25 to project a beam of light through the apertures 29 and 33, and to appear simultaneously and jointly and with equal intensity of illumination upon both mirrors 23, 23. The motor 53 sets the film 40 in the camera 38, in motion at a uniform rate of speed by means of a gear 58 which meshes with the gear 48 on the camera.

Figure 6:
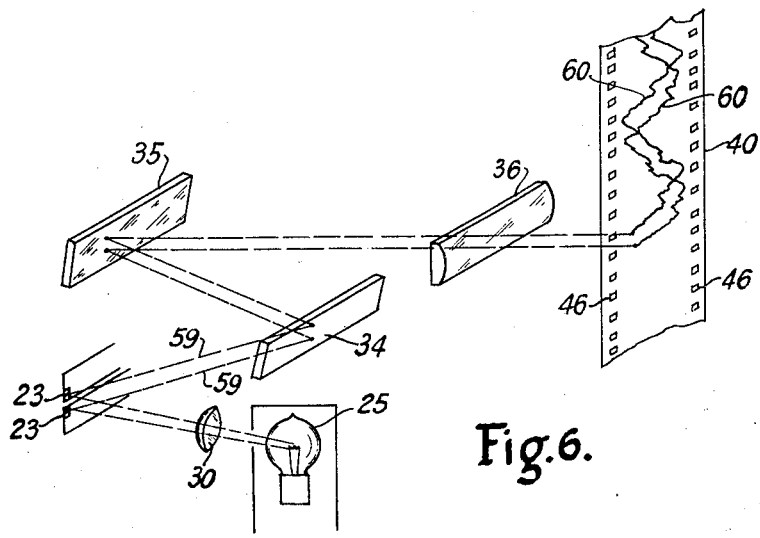
Figure 6 is a schematic view of the invention.

When the mirrors 23, 23, are set in vibration by air impulses from the diaphragms, the projected light on said mirrors is reflected and impinges on the stationary mirror 34 and there appears on the mirror 34 the reflections of two moving beams of light 59, 59. The moving beams of light appearing on the mirror 34 are reflected and strike the stationary mirror 35, and from the mirror 35 the beams of light are again reflected and pass through the cylindrical lens 36, and concentrate into focus upon the moving photographic film 40, and record wavy tracings 60, 60 thereon, as shown in Figure 6.

When the film 40 is in motion while the diaphragms are in a quiescent state, there are no vibrations and there is recorded on the moving film two parallel straight line tracings.

The camera 38 may be removed from the compartment 56 and the film 40 removed for development. A transparent scale (not shown) having graduations representing time intervals may be placed on the developed film containing the tracings and thus assist in analyzing the tracings.

It will thus be noted that this invention comprises two sensitive optical pulsatile elements operating with a minimum of frictional resistances, and registering the full effect of the pulsations, a source of light, means whereby the respective pulsations set mirrors of said optical pulsatile elements in vibration and cause changes in the direction of projected beams of light from said mirrors to effect wavy tracings upon a slowly moving photographic film.

It is desirable to secure wavy tracings of maximum amplitude on the particular width of film used and it is to be noted that while the optical polygraph may be designed so as to give wavy tracings of maximum amplitude by causing the reflected lights from the vibratory mirrors 23, 23, to follow a straight line and impinge directly on the film 40, that, for the desired maximum amplitude, the optical polygraph would be too long and would not be portable. Due to the use of the stationary mirrors 34, and 35, between the vibratory mirrors and the film, the total zig-zag distance travelled by a beam of light for a particular amplitude is equal to the distance travelled in a straight line for the same amplitude, and the desired amplitude is thus accomplished in an instrument that is compact and portable.

It is readily seen that there has been provided a simple and inexpensive and portable instrument for obtaining photographic records of arterial pulsations taken simultaneously at different parts of the body for purposes of diagnosis of disorders of the heart and for recording the movements of the respiratory organs. While my optical polygraph is primarily intended for medical purposes, it is obvious that it may be used to record vibrations in general, such as that occuring in machinery used in the industrial arts, in which case only one of the diaphragms 10 is used and only one tracing is made on the film.

Having thus described my invention, I claim as new and desire to secure by Letters Patent:

1. In a portable optical polygraph, the combination with a pulsatile element comprising an air tube open at one end and a spring-urged arm for sealing said end and having a mirror fastened thereon and being adapted to be set in vibration by pulsations, a source of light and means for causing a beam of light to impinge on said vibratory mirror, two stationary mirrors facing each other for receiving and redirecting the reflections from said vibratory mirror in the same direction acquired at its point of origination and a concentrating lens for causing said beam of light to concentrate into focus upon a moving photographic film and producing wavy records of arterial pulsations.

2. In a portable optical polygraph, the combination with a diaphragm and an air tube connected thereto and being open at one end, and a spring-urged arm for sealing said end and having a light reflecting means fastened thereon and adapted to be set in vibration by pulsations, a source of light and means for causing a beam of light to impinge on said vibratory light reflecting means, stationary light reflecting means for receiving and redirecting the reflections from said vibratory light reflecting means in the same direction acquired at its point of origination and a lens for concentrating said beam of light into focus upon a moving photographic film.

3. In a portable optical polygraph adapted for recording pulsatory vibrations, the combination with a diaphragm and a yieldable tube terminating in a non-yieldable tubular member and an arm having a light reflector fastened thereon and being mounted on a spring and adapted for vibration in an angular direction, said arm being urged by said spring to seal said tubular member, said diaphragm being adapted to receive and transmit pulsatory impulses against said vibratory arm and light reflector in a direction outwardly from said tubular member and breaking said seal and thus permitting the pulsatory air in said tubular member to escape freely therefrom and exert its full force against the arm, a source of light and means for concentrating a beam of light upon said vibratory light reflector, two spaced stationary light reflectors facing each other and being angularly positioned with said vibratory light reflector to permit the angularly reflected beam of light from said vibratory light reflector to continue in the same direction acquired at its point of origination to a desirable maximum length of chord, and means for concentrating said light beam upon a moving photographic film and causing a wavy tracing of an amplitude substantially equal to the full width of said film.

4. In a portable optical polygraph adapted for recording pulsatory vibrations, the combination with a diaphragm and an air tube connected thereto and being open at one end for transmitting pulsatory impulses to vibratory light reflecting means, a source of light and means for concentrating a beam of light on said vibratory light reflecting means, reflecting means for receiving and redirecting the reflections from said vibratory light reflecting means to cause it to continue in the same direction acquired at its point of origination and means for focusing said light upon a film and causing photographic records of said pulsatory vibrations.

Signed at Newark, in the county of Essex, and State of New Jersey, this sixth day of March, A. D. 1931.

EMIL BLUM.